(12) United States Patent
Lee

(10) Patent No.: US 12,397,749 B2
(45) Date of Patent: Aug. 26, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jeongtae Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 311 days.

(21) Appl. No.: 17/722,583

(22) Filed: Apr. 18, 2022

(65) Prior Publication Data

US 2022/0388477 A1   Dec. 8, 2022

(30) Foreign Application Priority Data

Jun. 8, 2021   (KR) .................. 10-2021-0074008

(51) Int. Cl.
*B60R 25/24*   (2013.01)
*H01Q 1/32*    (2006.01)

(52) U.S. Cl.
CPC ......... *B60R 25/245* (2013.01); *H01Q 1/3241* (2013.01); *H01Q 1/3275* (2013.01); *B60R 2325/101* (2013.01)

(58) Field of Classification Search
CPC ............ B60R 25/245; B60R 2325/101; H01Q 1/3241; H01Q 1/3275
USPC ..................................................... 340/426.36
See application file for complete search history.

(56) References Cited

U.S. PATENT DOCUMENTS

| | | | |
|---|---|---|---|
| 8,442,719 B1 * | 5/2013 | Nowottnick | G07C 9/00309 701/49 |
| 2012/0286926 A1 * | 11/2012 | Higemoto | G01S 13/82 340/5.61 |
| 2019/0082313 A1 * | 3/2019 | Kerselaers | H04W 4/40 |
| 2020/0082653 A1 * | 3/2020 | Hazebrouck | G01S 11/06 |

* cited by examiner

*Primary Examiner* — Kam Wan Ma
(74) *Attorney, Agent, or Firm* — Morgan, Lewis & Bockius LLP

(57) ABSTRACT

A vehicle, including: a first antenna module located inside the vehicle and including a communication antenna and a communication module; a second antenna module located outside the vehicle and including a communication antenna and a communication module; and a controller configured to control the first antenna module and the second antenna module to wirelessly communicate with each other, identify a distance from the vehicle to a digital key through a communication between the second antenna module and the digital key to control the vehicle, and identify whether the digital key is inside the vehicle by scanning the inside of the vehicle by the first antenna module to control the vehicle.

6 Claims, 8 Drawing Sheets

VEHICLE AND CONTROL METHOD THEREOF

CROSS-REFERENCE TO RELATED APPLICATION

This application is based on and claims priority under 35 U.S.C. § 119 to Korean Patent Application No. 10-2021-0074008, filed on Jun. 8, 2021 in the Korean Intellectual Property Office, the disclosure of which is incorporated herein by reference.

TECHNICAL FIELD

The disclosure relates to a vehicle controlled by a digital key and a control method thereof.

BACKGROUND

A digital key system enables a vehicle door to be opened or closed without inserting a key into a key slot of the vehicle door, or enables the vehicle to start without inserting the key into a key hole inside the vehicle, on the premise that a user with a digital key is located near the vehicle.

The digital key system includes i) a process of controlling the vehicle from an outside of the vehicle by determining a location of a user possessing the digital key when the user is located outside the vehicle, and ii) a process of controlling the vehicle from an inside of the vehicle when the digital key enters inside the vehicle.

As described above, the digital key system may conveniently control the vehicle through wireless communication, but may not easily distinguish indoor/outdoor areas of the vehicle.

SUMMARY

An aspect of the disclosure provides a vehicle and a control method thereof that may implement a digital key system through wireless Bluetooth low energy communication by adding a Bluetooth low energy antenna, in order to control the vehicle by identifying a distance between the vehicle and a digital key and distinguishing indoor/outdoor areas of the vehicle.

Additional aspects of the disclosure will be set forth in part in the description which follows and, in part, will be obvious from the description, or may be learned by practice of the disclosure.

According to an aspect of the disclosure, there is provided a vehicle, including: a first antenna module located inside the vehicle and including a communication antenna and a communication module; a second antenna module located outside the vehicle and including a communication antenna and a communication module; and a controller configured to: control the first antenna module and the second antenna module to wirelessly communicate with each other, and control the vehicle by identifying a distance from the vehicle to a digital key through a communication between the second antenna module and the digital key, and identifying whether the digital key is inside the vehicle by scanning the inside of the vehicle by the first antenna module.

The first antenna module is configured to communicate with the second antenna module in a master-slave configuration, the first antenna module is a master, and the second antenna module is a slave.

The controller is further configured to control the vehicle in such a manner that the second antenna module wirelessly shares location data with the first antenna module, the location data being determined by identifying a distance between the second antenna module and the digital key.

The controller is further configured to provide a passive entry, from an outside of the vehicle based on the digital key being identified to be located outside the vehicle according to the determined location data.

The controller is further configured to provide a passive service, from the inside of the vehicle based on the digital key being identified to be located inside the vehicle according to the determined location data.

The second antenna module is configured to directly apply constant power for wireless Bluetooth low energy communication with the first antenna module.

The second antenna module is configured to be a shark antenna located on a roof of the vehicle, and include a Bluetooth low energy module and a Bluetooth low energy antenna.

According to an aspect of the disclosure, there is provided a control method of a vehicle including a first antenna module located inside the vehicle and including a communication antenna and a communication module, and a second antenna module located outside the vehicle and including a communication antenna and a communication module, the control method including: detecting, by the second antenna module, a digital key configured to perform a wireless communication; when the digital key is detected, determining, by the second antenna module, a distance to the digital key including performing the wireless communication with the digital key and, to control the vehicle; scanning, by the first antenna module, an inside of the vehicle; and identifying, by the first antenna module, whether the digital key is inside the vehicle to control the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
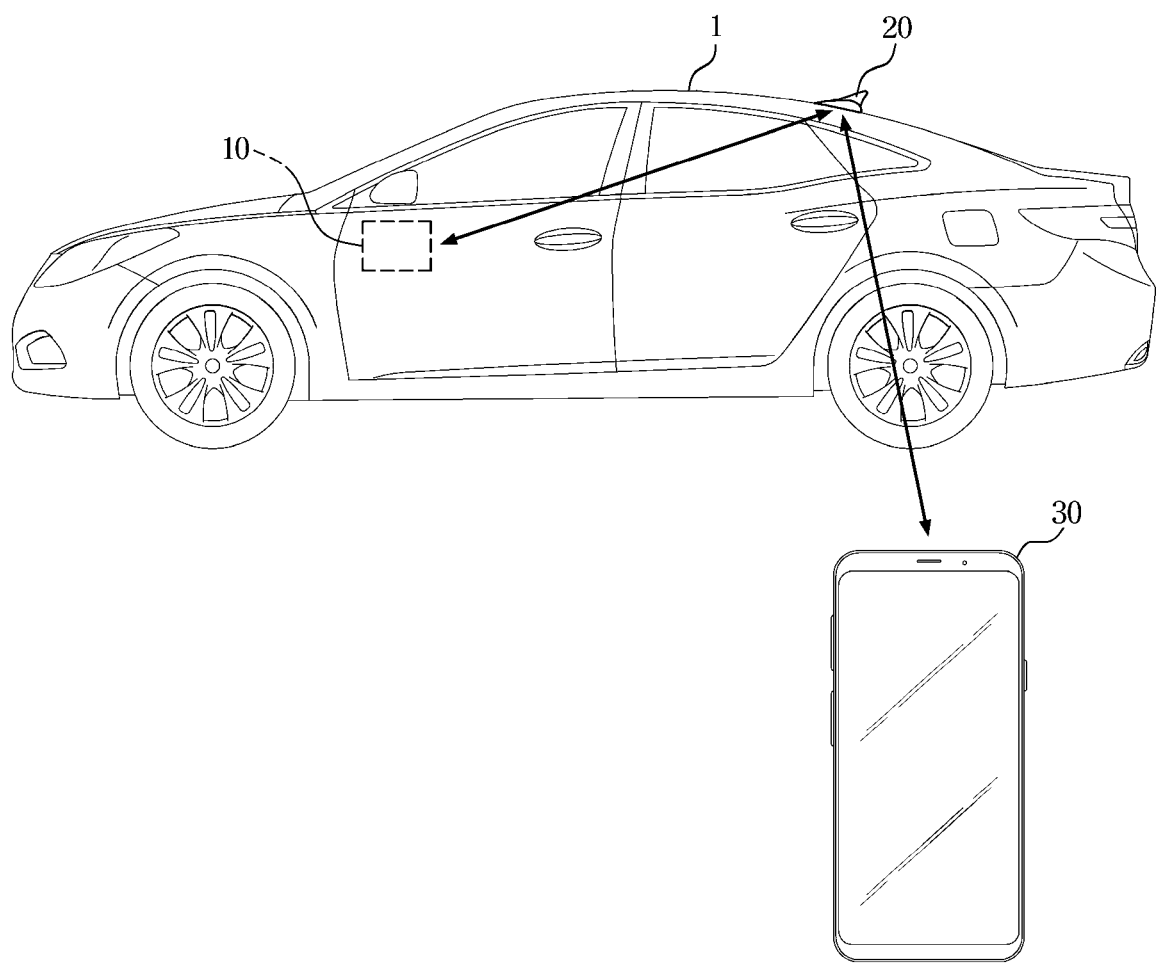
FIG. 1 is a diagram illustrating a vehicle and a digital key according to an embodiment.

The embodiments set forth herein and illustrated in the configuration of the disclosure are only preferred embodiments, so it should be understood that they may be replaced with various equivalents and modifications at the time of the disclosure.

Also, like reference numerals throughout the specification denote like elements.

Also, terminologies used herein are for the purpose of describing particular embodiments only and is not intended to limit the disclosure. It is to be understood that the singular forms are intended to include the plural forms as well, unless the context clearly dictates otherwise. It will be further understood that the terms "include", "comprise" and/or "have" when used in this specification, specify the presence of stated features, integers, steps, operations, elements, and/or components, but do not exclude the presence or addition of one or more other undisclosed features, integers, steps, operations, elements, components, and/or groups thereof.

Also, it will be understood that, although the terms first, second, etc. may be used herein to describe various elements, these elements should not be limited by these terms. For example, without departing from the technical spirit or essential features of the disclosure, a first element may be referred to as a second element, and also a second element may be referred to as a first element. Descriptions shall be understood as to include any and all combinations of one or more of the associated listed items when the items are described by using the conjunctive term "and/or".

Also, the terms such as "controller", "~part", "~device", "~module", "~member", "~block" and the like may refer to a unit for processing at least one function or act. For example, the terms may include at least one of a memory and a processor and may refer to at least process processed by at least one hardware, such as a field-programmable gate array (FPGA)/application specific integrated circuit (ASIC), etc., software stored in memories or processors.

Reference numerals used for method steps are just used for convenience of explanation, but not to limit an order of the steps. Thus, unless the context clearly dictates otherwise, the written order may be practiced otherwise.

Meanwhile, embodiments can be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Hereinafter, an operation principle and embodiments will be described in detail with reference to the accompanying drawings.

FIG. 1 is a diagram illustrating a vehicle 1 and a digital key 30 according to an embodiment.

In a conventional art, a vehicle key is required to be inserted into a key slot in a vehicle door to open the vehicle door or be inserted into a key hole inside the vehicle to start the vehicle.

As shown in FIG. 1, however, the vehicle 1 according to an embodiment may perform wireless communication with the digital key 30 possessed by a user, and when communication is connected, the vehicle 1 may unlock a vehicle door or start the vehicle 1 without inserting the digital key 30.

FIG. 1 illustrates that a control operation such as unlocking the vehicle door, and the like, may be performed using wireless communication between the digital key 30 and a second antenna module 20 of the vehicle 1. Information such as information on a distance from the vehicle 1 to the digital key 30 may be shared through wireless communication between the second antenna module 20 and a first antenna module 10, and the vehicle 1 may be controlled based on the information.

Specifically, a distance from the second antenna module 20 to the digital key 30 is identified by wireless communication between the second antenna module 20 and the digital key 30, and the second antenna module 20 may share the information such as the distance with the first antenna module 10. Data about the distance from the second antenna module 20 to the digital key 30 is referred to as location data. When the digital key 30 is located apart from the second antenna module 20 by a predetermined distance or more using the location data, it is identified that the digital key 30 is outside the vehicle 1, and when the digital key 30 is located apart from the second antenna module 20 by less than the predetermined distance, it is identified that the digital key 30 is located inside the vehicle 1. Accordingly, the vehicle 1 may be controlled differently depending on whether the digital key 30 is located outside or inside the vehicle 1.

As described above, the second antenna module 20 of the vehicle 1 may communicate with the digital key 30 and the first antenna module 10 wirelessly. In an existing design, in general, the second antenna module 20 communicates with the digital key 30 wirelessly, and location data determined by the wireless communication is transmitted to a master through a controller area network (CAN) transceiver using CAN communication. However, such design increases a cost for purchasing the CAN transceiver, requires a separate micro controller unit (MCU) resource for CAN communication, may not optimize an integrated chip (IC) specification, and increases a wiring cost and weight for CAN communication. A configuration of the second antenna module 20 to overcome such disadvantages is described in detail with reference to FIG. 2 below.

Figure 2:
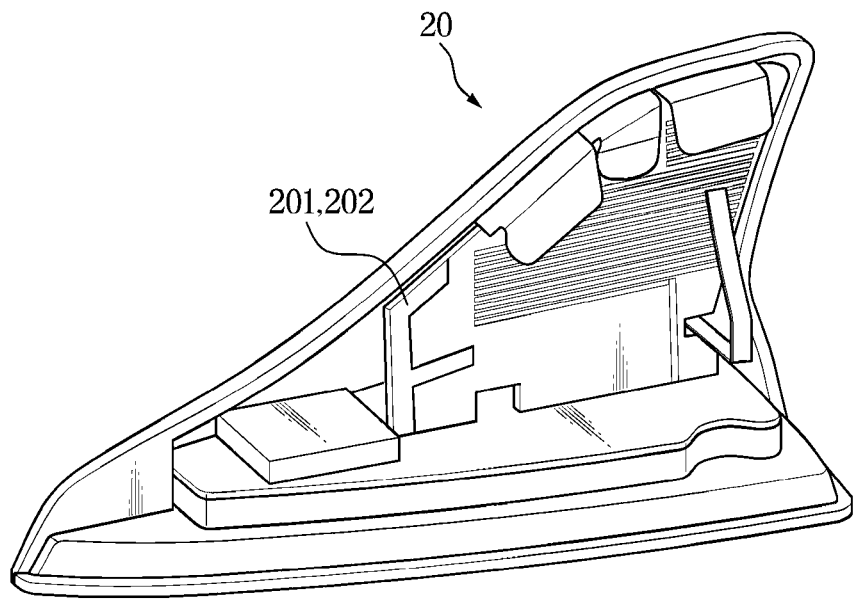
FIG. 2 is a diagram illustrating a detailed configuration of a second antenna module of a vehicle according to an embodiment.

FIG. 2 is a diagram illustrating a detailed configuration of the second antenna module 20 of the vehicle 1 according to an embodiment.

Referring to FIG. 2, constituent components installed inside the second antenna module 20 are shown, and the second antenna module 20 may be an existing shark antenna placed on an outside of the vehicle 1. The existing shark antenna includes a global positioning system (GPS) module, a radio module, a long term evolution (LTE) module, and the like. A Bluetooth low energy (BLE) module and a BLE antenna 202 and 201 are added to the second antenna module 20 of FIG. 2. The second antenna module 20 may wirelessly communicate with the first antenna module 10 and the digital key 30 by adding the BLE module and the BLE antenna 202 and 201, and in such process, constant power may be directly applied to replace CAN communication. Here, the constant power may be B+ power supply and may supply direct current (DC) 12V.

When the constant power is directly applied, a CAN transceiver may be omitted. Because the CAN transceiver and CAN communication are not used, a cost for purchasing the CAN transceiver may be saved. Also, a separate MCU resource for CAN communication is not required, resulting in optimization of an IC specification. Further, a wiring cost and weight for CAN communication may be decreased.

Accordingly, the second antenna module 20 may wirelessly share information such as location data with the first antenna module 10, not the wired CAN communication.

Figure 3:
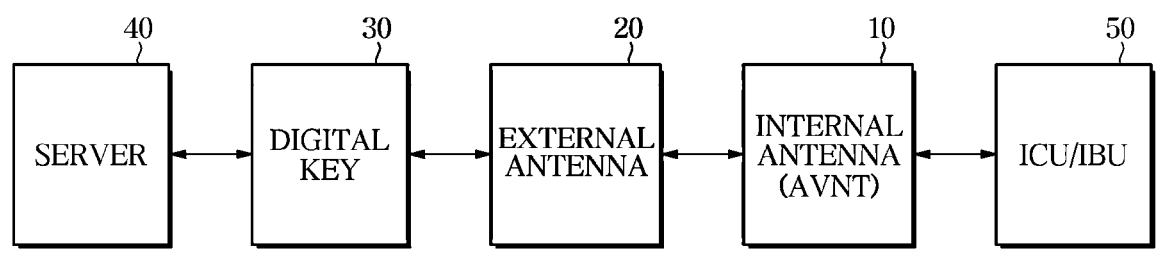
FIG. 3 is a diagram illustrating a second antenna module, a first antenna module and a digital key communicate with a server and an ICU/IBU in a vehicle according to an embodiment.

FIG. 3 is a diagram illustrating the second antenna module 20, the first antenna module 10 and the digital key 30 communicate with a server 50 and an ICU/IBU of the vehicle 1 according to an embodiment.

Referring to FIG. 3, an external antenna of FIG. 3 may be the second antenna module 20, and an internal antenna may be the first antenna module 10. The digital key 30 may communicate with the second antenna module 20 of the vehicle 1 wirelessly, and communicate with the server 50 through cellular data.

First, with respect to the communication with the server 50, the digital key 30 may be referred to as a smart key, a key fob, or the like. The digital key 30 may have a plurality of buttons or be in a shape of card. Any device that may open a door of the vehicle 1 or start the vehicle 1 may be the digital key 30, regardless of a name or a shape. For example, a mobile device such as a smart phone, a tablet personal computer (PC), a wearable device, and the like may be functioned as the digital key 30. In this instance, a program or an application capable of executing an operation as the digital key 30 may be installed in the mobile device. The mobile device with the program or application installed may be sold, or the program or application may be downloaded from the server 50 after a sale. Also, an additional authentication process may be separately performed in order for the mobile device to operate as the digital key 30. As described above, the digital key 30 may perform operations for security or authentication of an account through communication with the server 50, and also perform management, generation, and deletion of the digital key 30.

Next, with respect to the communication with the second antenna module 20 of the vehicle 1, a wireless BLE communication may be used as a communication method. A BLE communication may use a wireless personal area network (WPAN). Power consumption may be reduced by using the WPAN, compared to other wireless connection methods. Various types of WPANs such as non-standardized independent communication protocols exist, and main standardized wireless network may be Zigbee and Bluetooth. Bluetooth in the BLE communication has a different Bluetooth standard in existing voice communication, and a BLE technology operates in 80 MHz band in a range of 2.400 GHz to 2.480 GHz and may be classified into 40 channels at 2 MHz intervals. When the wireless BLE communication is used, a duty cycle is a few milliseconds (ms), a light driving method is used, a sleep mode is operated for most of the time when not in use, and thus power consumption may be reduced.

The communication between the second antenna module 20 and the first antenna module 10 of the vehicle 1 may be the wireless BLE communication. Also, the communication may be performed in a master-slave communication configuration where the first antenna module 10 is a master and the second antenna module 20 is a slave. In this instance, the master-slave communication may refer to an asymmetric communication model in which a device or a process (master) serving as a communication hub controls one or more other devices or processes (slaves). Accordingly, the first antenna module 10 as the master may control the second antenna module 20 which is the slave.

A configuration of the second antenna module 20 has been described above. The first antenna module 10 may be mounted in an audio, video, navigation, telematics (AVNT) device, which is an infotainment system for a vehicle. A BLE antenna and a BLE module used in the first antenna module 10 may be installed in a separate box. When the BLE antenna and the BLE module are installed in a separate box, for example, when the BLE antenna and the BLE module are added to a headlining of the vehicle 1, constant power may be directly applied like the second antenna module 20, as described above, and a CAN transceiver may be omitted. Accordingly, CAN communication and the CAN transceiver are not used, and thus a cost for purchasing the CAN transceiver may be saved. Also, a separate MCU resource for CAN communication is not required, resulting in optimization of an IC specification. Further, a wiring cost and weight for CAN communication may be decreased. However, because an antenna is not installed on an outside of the vehicle 1, but the separate box is added inside the vehicle 1, a maximum operating distance of the digital key 30 may not be improved due to the box located on an indoor roof. Accordingly, as shown in FIG. 3, when the BLE module and the BLE antenna are added and the second antenna module 20 is installed on the outside of the vehicle 1, a reception sensitivity and a reception rate of radio waves may be improved, and thereby may increase the maximum operating distance of the digital key 30 and improve coverage. While a coverage before improvement is up to 80 m from the vehicle 1 to outside, the coverage after improvement may be up to 300 m, when the BLE module and the BLE antenna are added and the second antenna module 20 is installed on the outside of the vehicle 1.

The first antenna module 10 of the vehicle 1 may be connected to an integrated control unit (ICU) and an integrated body unit (IBU) through CAN communication, and may be operated as a main to perform vehicle control.

Figure 4:
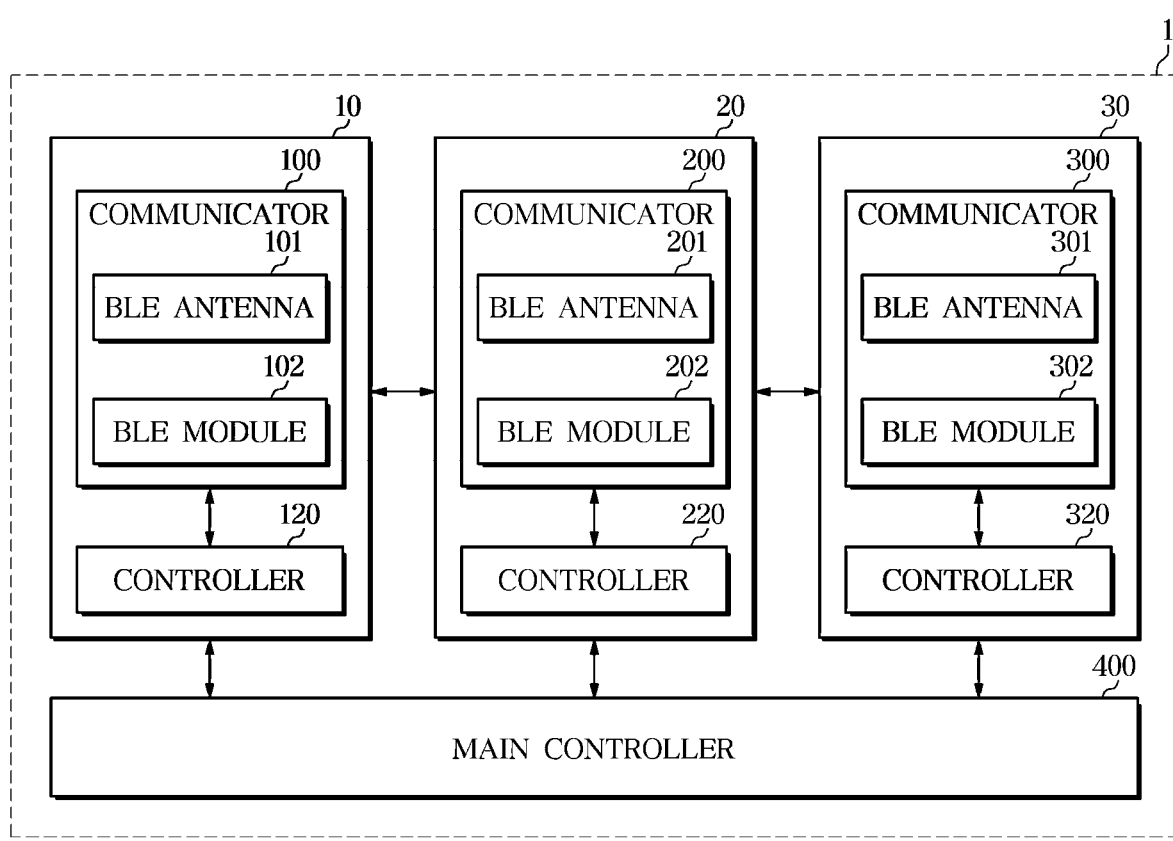
FIG. 4 is a control block diagram of a vehicle according to an embodiment.

FIG. 4 is a control block diagram of the vehicle 1 according to an embodiment.

Referring to FIG. 4, the vehicle 1 according to an embodiment may include communicators 100, 200 and 300 to enable the second antenna module 20 and the first antenna module 10 to perform communication, respectively, and each of the communicators 100, 200 and 300 includes a BLE antenna 101, 201 and 301 and a BLE module 102, 202 and 302. Here, the second antenna module 20 is wirelessly connected to the digital key 30 registered, and the first antenna module 10 is wirelessly connected to the second antenna module 20.

Each controller 120, 220 and 320 enables wireless communication between the digital key 30 and the second antenna module 20 and wireless communication between the second antenna module 20 and the first antenna module 10 to be performed. A main controller 400 may control each of the controllers 120, 220 and 320, and a control of the vehicle 1 may be differently performed when the digital key 30 is located outside the vehicle 1 and when inside the vehicle 1, which will be described later.

Figure 5:
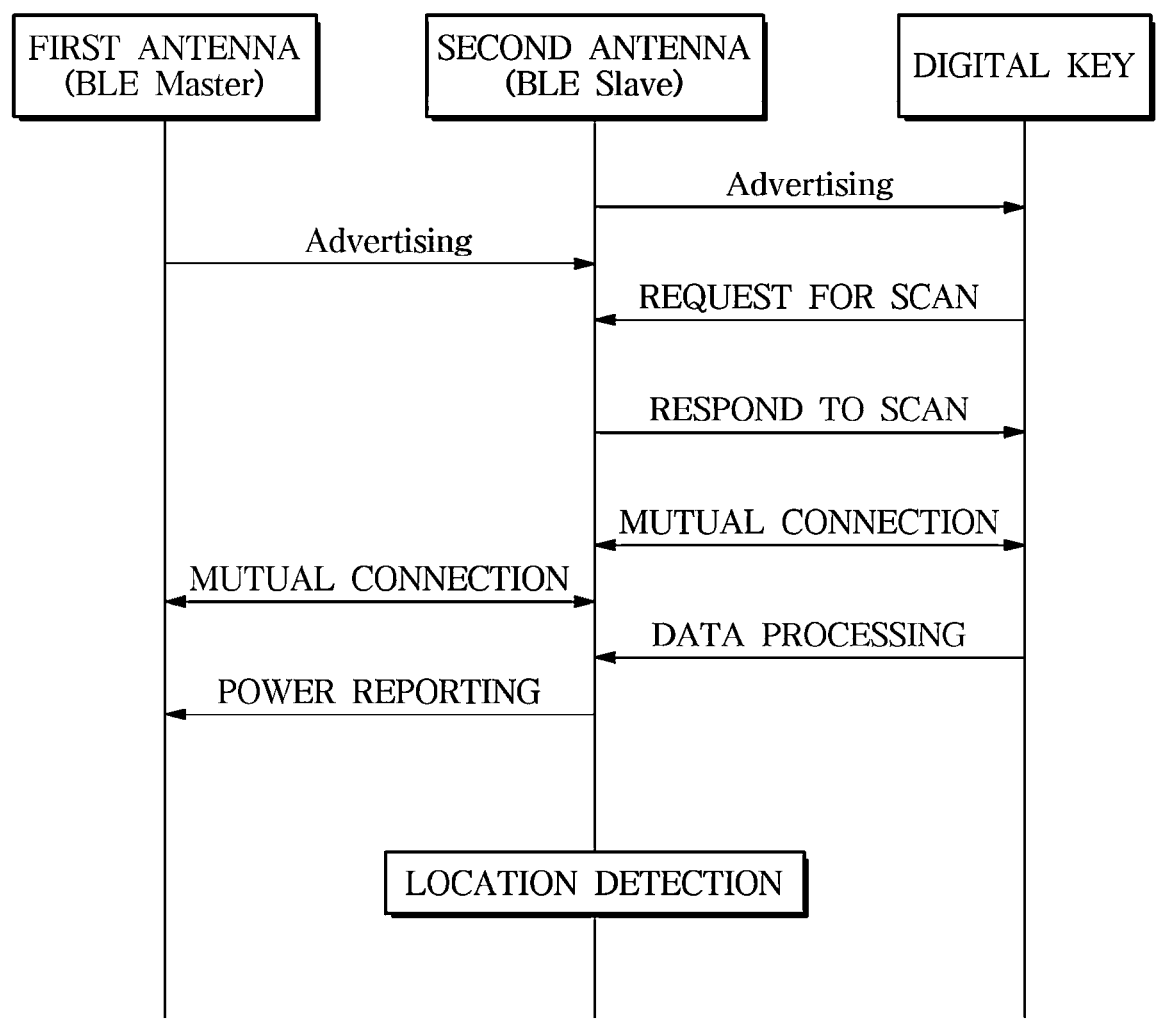
FIG. 5 is a diagram illustrating a process of establishing a connection of a second antenna module, a first antenna module and a digital key of a vehicle according to an embodiment.

FIG. 5 is a diagram illustrating a process of establishing a connection of the second antenna module 20, the first antenna module 10 and the digital key 30 of the vehicle 1 according to an embodiment.

Because the first antenna module 10 and the second antenna module 20, and the digital key 30 and the second antenna module 20 perform BLE communication, respectively, a connection may be established by a BLE communication connection procedure. Because the digital key 30 and the second antenna module 20 perform BLE communication first outside the vehicle 1, the second antenna module 20 may transmit an advertising packet to the digital key 30. Afterwards, the first antenna module 10 may transmit an advertising packet to the second antenna module 20 so that the second antenna module 20 shares information such as location data about a distance to the digital key 30 with the first antenna module 10. Then, the digital key 30 located within a communicable distance with the second antenna module 20 request a scan, the second antenna module 20 responds to the request for scanning, and thereby may establish a connection for communication. The first and second antenna modules 10 and 20 located at fixed positions may be connected to each other through a master-slave communication configuration. After connection is made, the digital key 30 may transmit information such as the location data to the second antenna module 20, and the second antenna module 20 as a slave reports power, etc., to the first antenna module 10. Accordingly, an area where the digital key 30 is located may be detected. Thus, a control of the vehicle 1 may be differently performed when the digital key 30 is located outside the vehicle 1 and when inside the vehicle 1.

Figure 6:
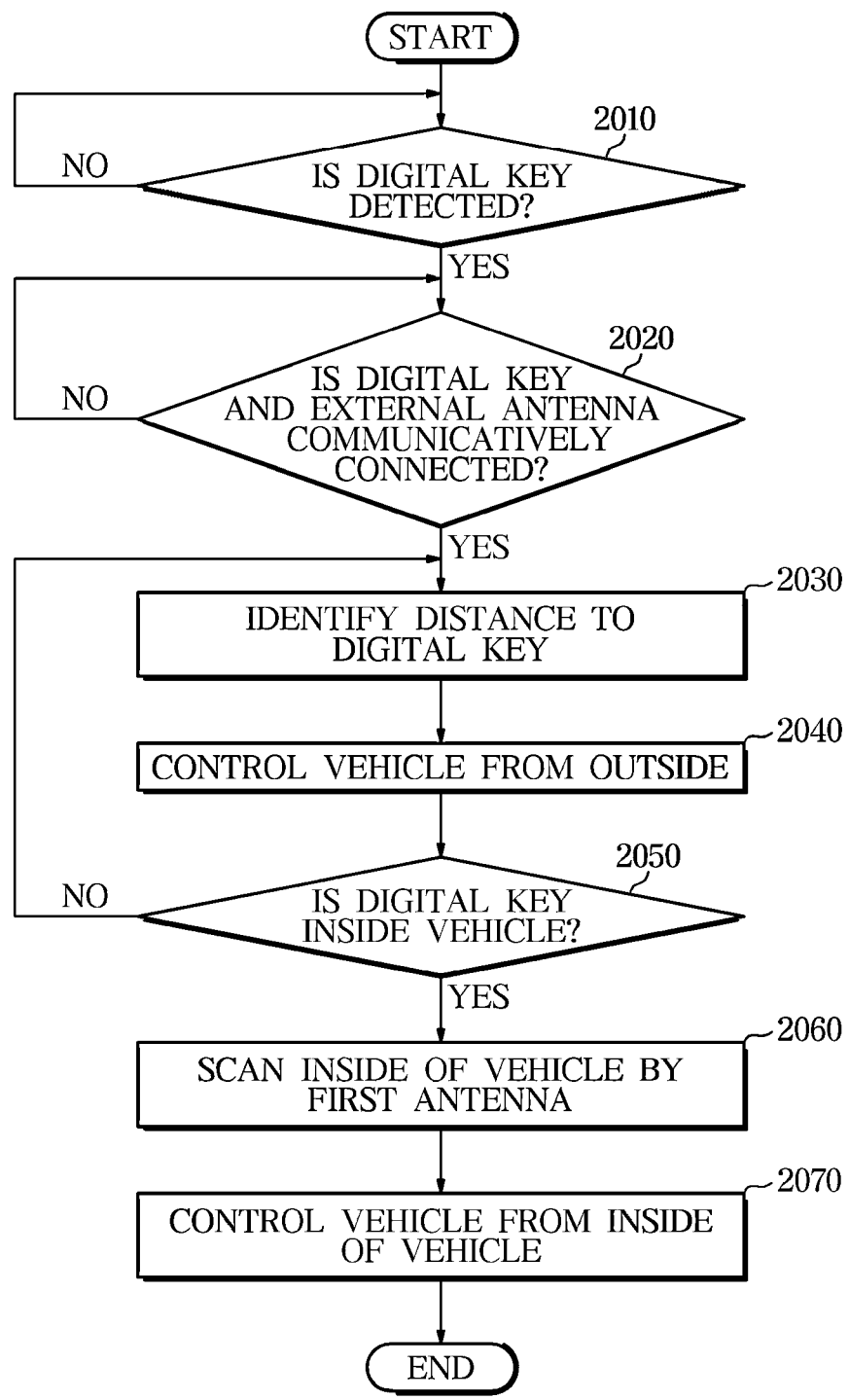
FIG. 6 is a flowchart illustrating vehicle control operations performed from an outside to an inside in a control method of a vehicle according to an embodiment.

FIG. 6 is a flowchart illustrating vehicle control operations performed from an outside to an inside in a control method of a vehicle according to an embodiment.

First, in step 2010, for example, the second antenna module 20 detects whether the digital key 30 is present in a vicinity of the vehicle 1, and when detected, and in step 2020, for example, the second antenna module 20 and the digital key 30 may be communicatively connected to each other, as described above. Afterwards, for example, in step 2030, a distance from the vehicle 1 to the digital key 30 is identified using location data, and then the vehicle 1 may be controlled outside the vehicle 1, for example, in step 2040. The controlling of the vehicle 1 outside the vehicle 1 may include an operation of opening a vehicle door or a tailgate or starting the vehicle 1 by transmitting a control signal to the vehicle 1 using the digital key 30 by a user actively, and also include a passive entry function enabling the user to enter the vehicle 1 without transmitting the control signal using the digital key 30 as long as the user possesses the digital key 30.

Then, whether the digital key 30 has entered the vehicle 1 may be identified, for example, in step 2050. Specifically, it is identified that the digital key 30 is inside the vehicle 1, when a location of the digital key 30 is identified using the location data and it is identified that the digital key 30 is located within a predetermined distance from the vehicle 1. When it is identified that the digital key 30 is inside the vehicle 1, the first antenna module 10 which is a master in a master-slave communication may scan an inside of the vehicle 1 as a main, for example, in step 2060. The vehicle 1 may be controlled, for example, in step 2070, through a passive service inside the vehicle 1 based on a result of the scanning described above. In this instance, the passive service refers to a vehicle control performed inside the vehicle 1, and may include engine start/stop, door locking/unlocking, tailgate opening/closing, welcome lights operation/non-operation, power sliding door opening/closing, etc.

As described above, in providing a system using the digital key 30, the second antenna module 20 is provided outside the vehicle 1, thereby may provide the passive entry and the passive service. Also, unlike an existing system using the digital key 30, because the location data may be transmitted without using CAN communication, a cost for purchasing a CAN transceiver may be saved. A separate MCU resource for CAN communication is not required, resulting in optimization of an IC specification. Further, a wiring cost and weight for CAN communication may be decreased.

Figure 7:
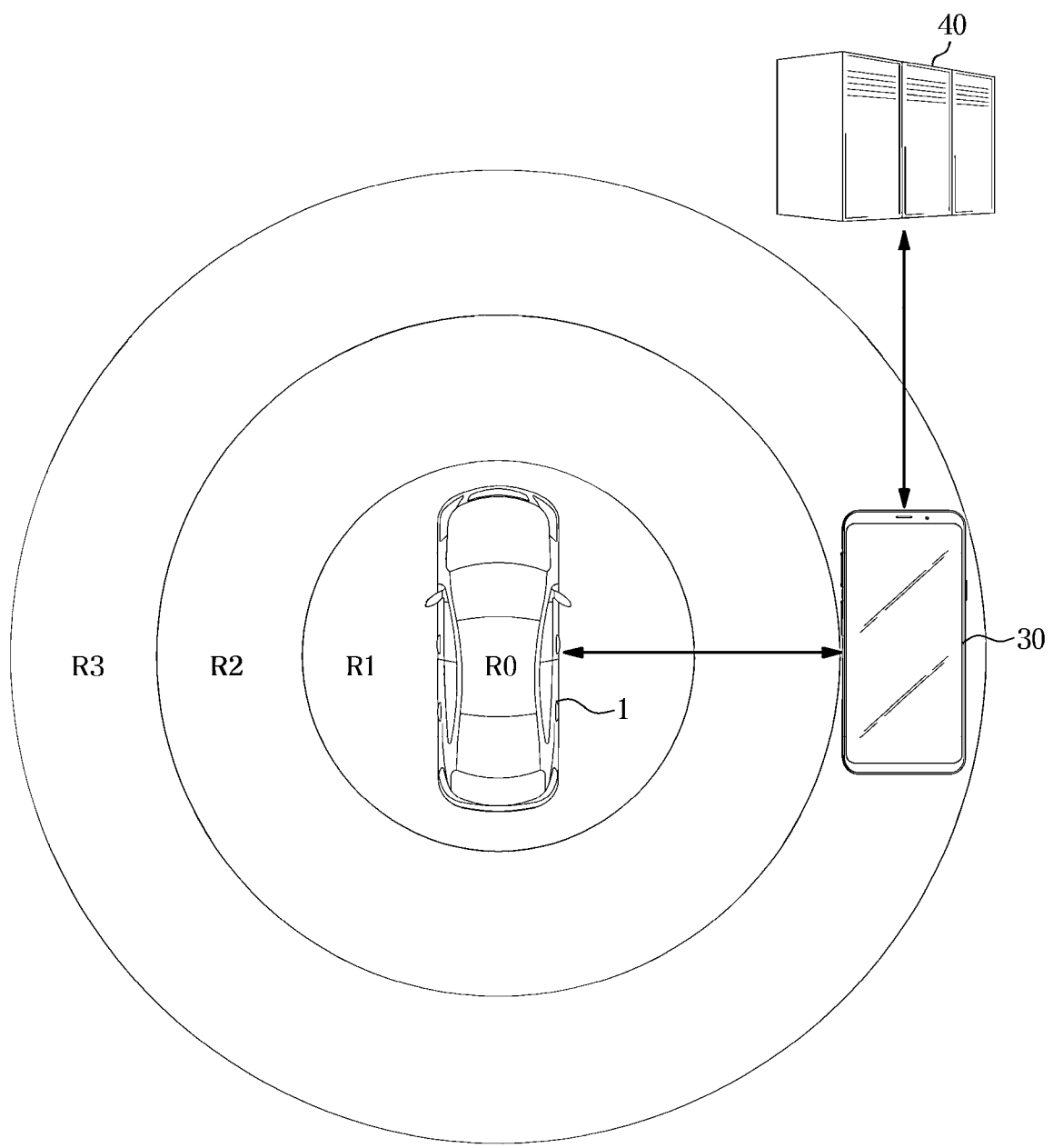
FIG. 7 is a diagram illustrating regions divided for implementing a passive entry by a vehicle according to an embodiment.
Figure 8:
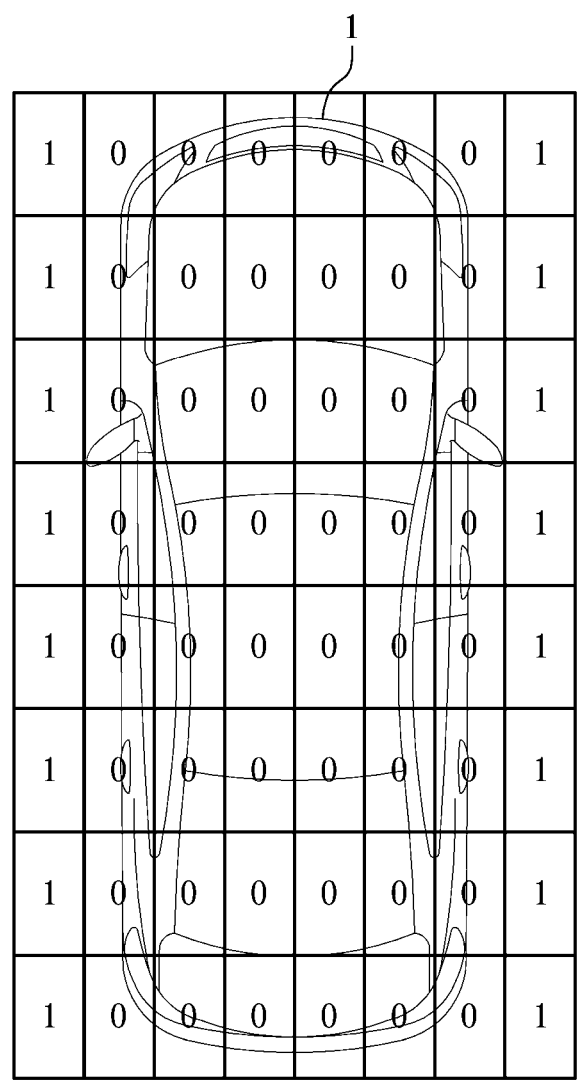
FIG. 8 is a diagram illustrating passive entry regions by adding a wireless Bluetooth low energy connection to a second antenna module of a vehicle according to an embodiment.

FIG. 7 is a diagram illustrating regions divided for implementing a passive entry by the vehicle 1 according to an embodiment. FIG. 8 is a diagram illustrating passive entry regions by adding a wireless Bluetooth low energy connection to the second antenna module 20 of the vehicle 1 according to an embodiment.

Referring to FIG. 7, the digital key 30 may perform operations for security or authentication of an account through communication with the server 50, and also perform management, generation, and deletion of the digital key 30. A location of the digital key 30 may be divided into R0, R1, R2 and R3, depending on a distance from the vehicle 1. Because R0 is a region in which the distance from the digital key 30 to the vehicle 1 is less than a predetermined distance, it is identified as an inside of the vehicle 1. R1 to R3 refers to regions gradually away from the vehicle 1. The dividing of R1 to R3 is performed to identify a location to which a user with the digital key 30 moves and to provide different functions depending on the identified location of the user. For example, when the user with the digital key 30 moves from R3 to R1, the user accesses to the vehicle 1, and thus a passive entry may be activated. When the user moves from R1 to R3, the user moves away from the vehicle 1, and thus a function such as locking a vehicle door may be provided.

Referring to FIG. 8, it is illustrated that the first antenna module 10 and the second antenna module 20 implement a pass entry region 0. Because a grid of 0 represented by R0 is identified as an inside of the vehicle 1, the passive entry that accurately distinguishes the inside and an outside of the vehicle 1 may be provided.

That is, as described above, the inside and the outside of the vehicle 1 may be distinguished through communication between the first antenna module 10 and the second antenna module 20 in order to implement the passive entry region 0/1. During the operation above, constant power may be directly applied at a closest location of the second antenna module 20, and a CAN transceiver may be omitted. For example, the term "constant power" refers to a power value that deviates less than 5, 4, 3, 2, or 1% from an average value or a predetermined value. Accordingly, the CAN transceiver and CAN communication are not used, and thus a cost for purchasing the CAN transceiver may be saved. Also, a separate MCU resource for CAN communication is not required, resulting in optimization of an IC specification. Further, a wiring cost and weight for CAN communication may be decreased. In addition, the second antenna module 20 is placed outside the vehicle 1, thereby may increase a maximum operating distance of the digital key 30 and improve coverage.

With respect to the control method of the vehicle of the disclosure, the second antenna module 20 detects whether the digital key 30 is present in a vicinity of the vehicle 1, and when detected, the second antenna module 20 and the digital key 30 may be controlled to be communicatively connected to each other, as described above. Afterwards, a distance from the vehicle 1 to the digital key 30 is identified using location data, and then the vehicle 1 may be controlled outside the vehicle 1. The controlling of the vehicle 1 outside the vehicle 1 may include an operation of opening a vehicle door or a tailgate or starting the vehicle 1 by transmitting a control signal to the vehicle 1 using the digital key 30 by a user actively, and also include a passive entry function enabling the user to enter the vehicle 1 without transmitting the control signal using the digital key 30 as long as the user possesses the digital key 30.

Then, it is controlled to identify whether the digital key 30 has entered the vehicle 1. Specifically, it is controlled to identify that the digital key 30 is inside the vehicle 1, when a location of the digital key 30 is identified using the location data and it is identified that the digital key 30 is located within a predetermined distance from the vehicle 1. When it is identified that the digital key 30 is inside the vehicle 1, the first antenna module 10 which is a master in a master-slave communication may scan an inside of the vehicle 1 as a main. The vehicle 1 may be controlled through a passive service inside the vehicle 1 based on a result of the scanning described above. In this instance, the passive service refers to a vehicle control performed inside the vehicle 1, and may include engine start/stop, door locking/unlocking, tailgate opening/closing, welcome lights operation/non-operation, power sliding door opening/closing, etc.

When the vehicle 1 is controlled by the control method described above, a GPS/Radio/LTE reception performance provided by an existing shark antenna may be maintained and the inside of the vehicle 1 may be recognized. At the same time, a function of a CAN communication method may be implemented as it is using a wireless BLE communication. In addition, a cost of a CAN transceiver and wiring for CAN communication may be saved. Further, an additional MCU resource for CAN communication is not required, thereby may optimize an IC specification. Also, a wiring weight for CAN communication may be decreased.

As is apparent from the above, according to the embodiment of the disclosure, the vehicle and the control method thereof can omit a CAN transceiver while maintaining a passive entry performance of a digital key, and thereby may save a cost for purchasing the CAN transceiver and a wiring for CAN communication, and reduce a wiring weight for CAN communication.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
    a first antenna module located inside the vehicle and including a communication antenna and a communication module;
    a second antenna module located outside the vehicle and including a communication antenna and a communication module; and
    a controller configured to:
        control the first antenna module and the second antenna module to wirelessly communicate with each other;
        perform a first communication process in which the second antenna module wirelessly connects to a digital key located outside the vehicle;
        after the first communication process, perform a second communication process in which the second antenna module transmits information about the digital key to the first antenna module;
        identify a distance from the vehicle to the digital key through a communication between the second antenna module and the digital key, and identifying whether the digital key is inside the vehicle by scanning the inside of the vehicle by the first antenna module based on the information received in the second communication process;
        provide a passive entry, from an outside of the vehicle based on the digital key being identified to be located outside the vehicle; and
        provide a passive service, from the inside of the vehicle based on the digital key being identified to be located inside the vehicle.

2. The vehicle of claim 1, wherein the first antenna module is configured to communicate with the second antenna module in a master-slave configuration, the first antenna module is a master, and the second antenna module is a slave.

3. The vehicle of claim 1, wherein the controller is further configured to control the vehicle in such a manner that the second antenna module wirelessly shares location data with the first antenna module, the location data being determined by identifying a distance between the second antenna module and the digital key.

4. The vehicle of claim 1, wherein the second antenna module is configured to directly apply constant power for wireless Bluetooth low energy communication with the first antenna module.

5. The vehicle of claim 1, wherein the second antenna module is configured to be a shark antenna located on a roof of the vehicle, and include a Bluetooth low energy module and a Bluetooth low energy antenna.

6. A control method of a vehicle comprising a first antenna module located inside the vehicle and including a communication antenna and a communication module, and a second antenna module located outside the vehicle and including a communication antenna and a communication module, the control method comprising:
    performing, by the second antenna module, a first communication process in which the second antenna module wirelessly connects to a digital key located outside the vehicle;
    after the first communication process, performing, by the second antenna module, a second communication process in which the second antenna module transmits information about the digital key to the first antenna module;
    determining, by a controller, a distance to the digital key through a communication between the second antenna module and the digital key, and identifying whether the digital key is inside the vehicle by scanning the inside of the vehicle by the first antenna module based on the information received in the second communication process;
    providing a passive entry, by the controller, from an outside of the vehicle based on the digital key being identified to be located outside the vehicle, and
    providing a passive service, by the controller, from the inside of the vehicle based on the digital key being identified to be located inside the vehicle.

* * * * *